(12) United States Patent
Park et al.

(10) Patent No.: US 11,143,918 B2
(45) Date of Patent: Oct. 12, 2021

(54) DISPLAY DEVICE

(71) Applicant: Samsung Display Co., Ltd., Yongin-si (KR)

(72) Inventors: Sae Ron Park, Gimhae-si (KR); Do Yeong Park, Hwaseong-si (KR); Hyun Soo Ryu, Daejeon (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/243,065

(22) Filed: Jan. 8, 2019

(65) Prior Publication Data

US 2019/0331953 A1   Oct. 31, 2019

(30) Foreign Application Priority Data

Apr. 27, 2018   (KR) .......................... 10-2018-0049227

(51) Int. Cl.
*G02F 1/1339*   (2006.01)

(52) U.S. Cl.
CPC ...... *G02F 1/13394* (2013.01); *G02F 1/13396* (2021.01); *G02F 1/13398* (2021.01)

(58) Field of Classification Search
CPC ....... G02F 2001/13396; G02F 1/13394; G02F 2001/13398; G02F 1/13396; G02F 1/13398

See application file for complete search history.

(56) References Cited

U.S. PATENT DOCUMENTS

| | | | |
|---|---|---|---|
| 2006/0192915 A1* | 8/2006 | Kimura | G02F 1/13452 349/151 |
| 2008/0158496 A1* | 7/2008 | Kim | G02F 1/13394 349/151 |
| 2015/0002500 A1* | 1/2015 | Choi | G02F 1/13306 345/211 |
| 2017/0010496 A1* | 1/2017 | Shim | G02F 1/133512 |
| 2017/0227804 A1* | 8/2017 | Nagasawa | G02F 1/13394 |
| 2017/0285389 A1* | 10/2017 | Nishitani | G02F 1/133788 |
| 2018/0157127 A1* | 6/2018 | Ye | G02F 1/1337 |
| 2018/0341141 A1* | 11/2018 | Lin | G02F 1/133512 |
| 2019/0018273 A1 | 1/2019 | Park et al. | |
| 2019/0064571 A1* | 2/2019 | Zhu | G02F 1/13394 |
| 2019/0121185 A1* | 4/2019 | Liu | G02F 1/13394 |
| 2019/0237706 A1* | 8/2019 | Jin | H01L 27/3246 |

FOREIGN PATENT DOCUMENTS

KR   10-2019-0007130   1/2019

\* cited by examiner

*Primary Examiner* — Mariam Qureshi
(74) *Attorney, Agent, or Firm* — H.C. Park & Associates, PLC

(57) ABSTRACT

A display device includes: a base substrate including a display area and a peripheral area; a scan driver disposed on the peripheral area of the base substrate; and a spacer overlapping the scan driver, wherein the spacer includes a first spacer and a second spacer which are spaced apart from each other and have different heights.

20 Claims, 12 Drawing Sheets

DISPLAY DEVICE

CROSS REFERENCE TO RELATED APPLICATION

This application claims priority from and the benefit of Korean Patent Application No. 10-2018-0049227, filed on Apr. 27, 2018, which is hereby incorporated by reference for all purposes as if fully set forth herein.

BACKGROUND

Field

Exemplary embodiments/implementations of the invention relate generally to a display device, particularly to a display device with improved durability.

Discussion of the Background

With the development of multimedia, display devices are becoming increasingly important. Accordingly, various types of display devices such as liquid crystal displays (LCDs) and organic light emitting displays (OLEDs) are being used.

LCDs are one of the most widely used types of flat panel displays. An LCD includes a pair of substrates having field generating electrodes, such as pixel electrodes and a common electrode, and a liquid crystal layer inserted between the two substrates. In the LCD, voltages are applied to the field generating electrodes to generate an electric field in the liquid crystal layer. Accordingly, the alignment of liquid crystal molecules in the liquid crystal layer is determined, and the polarization of incident light is controlled. As a result, the desired image is displayed on the LCD.

A display device may include a display area which displays an image and a peripheral area which is disposed around the display area and does not display an image. Circuits (such as wires, elements, etc.) required to display an image may be located in the peripheral area.

The above information disclosed in this Background section is only for understanding of the background of the inventive concepts, and, therefore, it may contain information that does not constitute prior art.

SUMMARY

Devices constructed according to exemplary embodiments of the invention may provide a display device having no or reduced step difference between a display area and a peripheral area to prevent or reduce an edge stain defect (e.g., a defect that the step difference is visible like a stain on the edge of the display device) due to the step difference. Furthermore, a device according to exemplary embodiments of the invention may prevent or reduce the deterioration of the characteristics of the switching elements included in a scan driver using a simplified manufacturing process.

Additional features of the inventive concepts will be set forth in the description which follows, and in part will be apparent from the description, or may be learned by practice of the inventive concepts.

According to one or more embodiments of the invention, a display device includes: a base substrate including a display area and a peripheral area; a scan driver disposed on the peripheral area of the base substrate; and a spacer overlapping the scan driver, wherein the spacer includes a first spacer and a second spacer which are spaced apart from each other and have different heights.

The display device may further include a counter substrate facing the base substrate and is spaced apart from the base substrate, wherein the spacer may be configured to maintain a gap between the base substrate and the counter substrate.

The first spacer may contact the counter substrate, and the second spacer may be spaced apart from the counter substrate.

The counter substrate may include a wavelength conversion pattern.

A height of the first spacer may be greater than a height of the second spacer.

A difference between the height of the first spacer and the height of the second spacer may be in a range of about 0.3 μm to about 0.7 μm.

A planar area of the second spacer may be larger than a planar area of the first spacer.

The first spacer may be surrounded by the second spacer.

The spacer may overlap about 80% or more of a planar area of the scan driver.

At least one side of the spacer may be disposed outside a side of the scan driver.

A distance between the first spacer and the second spacer may be in a range of about 10 μm to about 30 μm.

The spacer may block blue light having a center wavelength of about 420 nm to about 480 nm.

Light transmittance of the spacer may be about 10% or less.

According to one or more embodiments of the invention, a display device includes: a base substrate including a display area and a peripheral area; a counter substrate facing the base substrate; a column spacer disposed on the display area of the base substrate; a scan driver disposed on the peripheral area of the base substrate; and a spacer disposed on the peripheral area of the base substrate, the spacer overlapping the scan driver, wherein the column spacer includes a main column spacer and a sub-column spacer which are spaced apart from each other and have different heights, and the spacer includes a first spacer and a second spacer which are spaced apart from each other and have different heights.

The main column spacer and the first spacer may contact the counter substrate.

The sub-column spacer and the second spacer may be spaced apart from the counter substrate.

The spacer may block blue light having a center wavelength of about 420 nm to about 480 nm.

Light transmittance of the spacer may be about 10% or less.

The spacer may overlap about 80% or more of the planar area of the scan driver.

At least one side of the spacer may be disposed outside a side of the scan driver.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
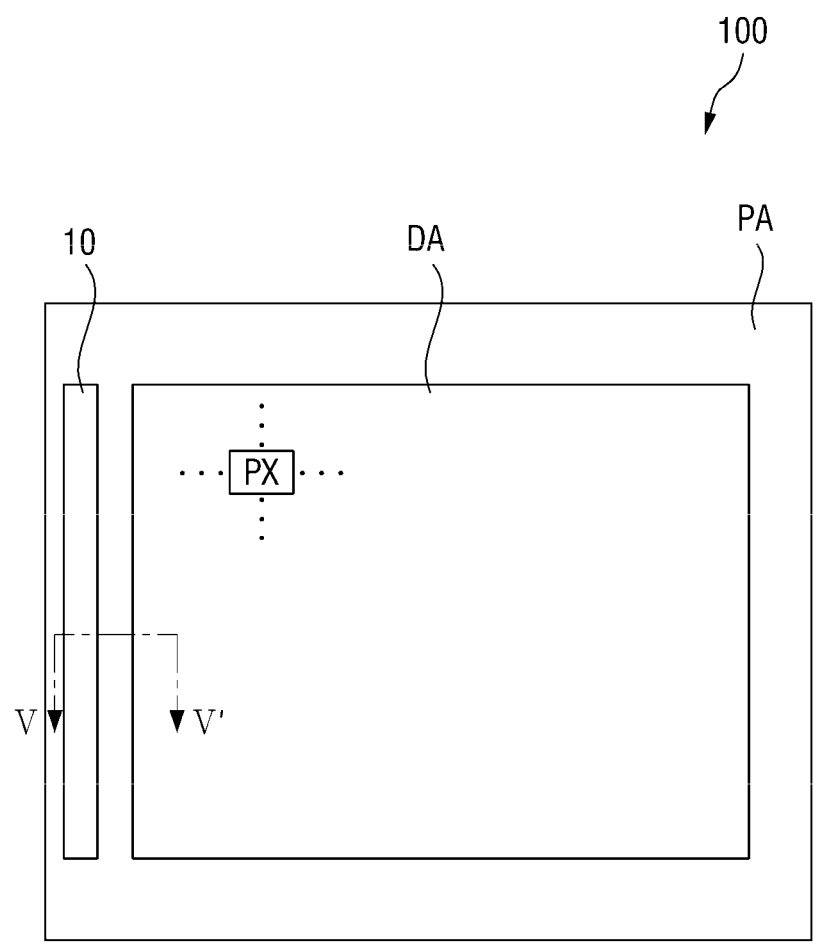
FIG. 1 is a schematic plan view of an array substrate of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalties between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the present disclosure will be described with reference to the accompanying drawings.

Figure 2:
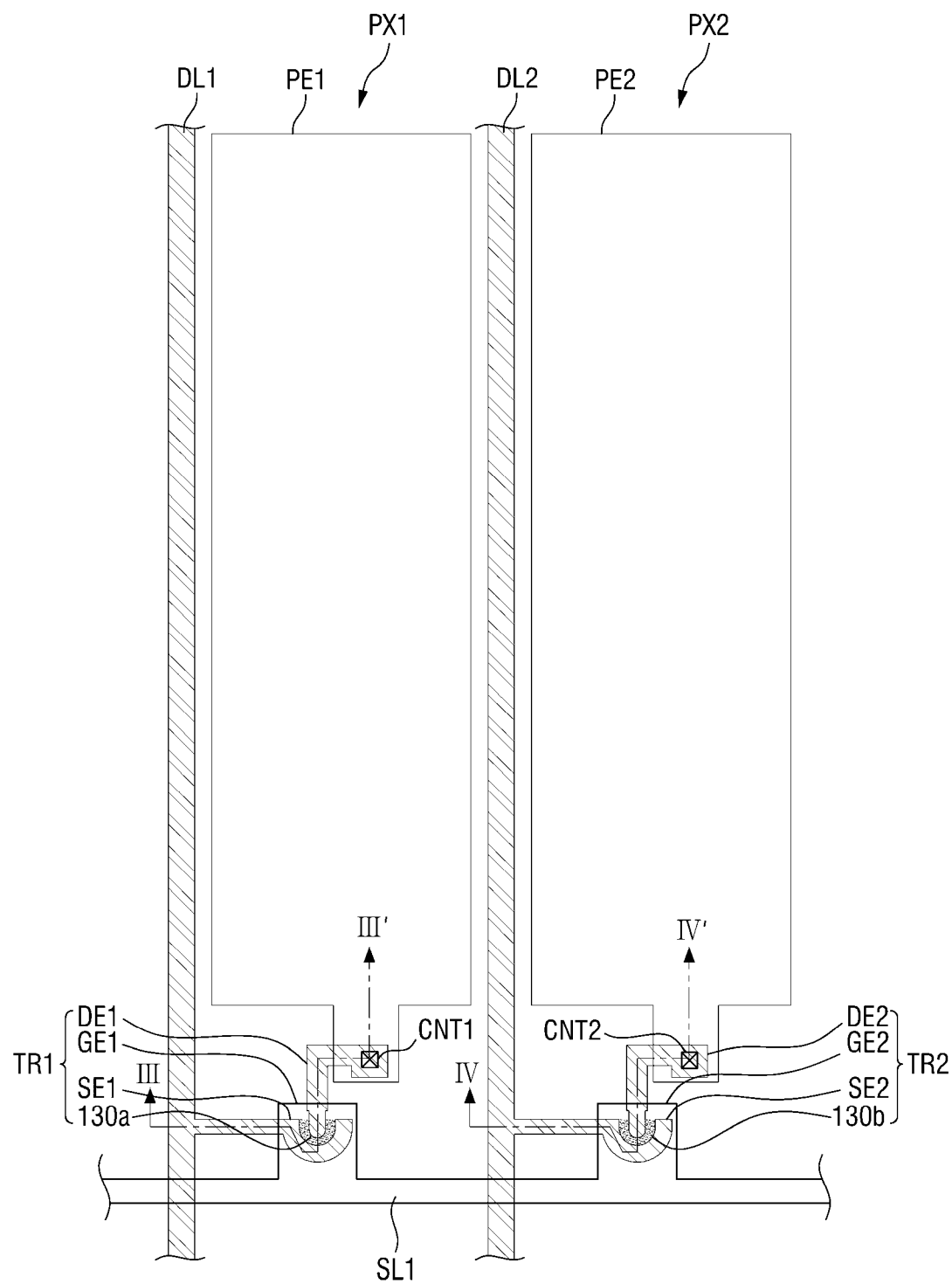
FIG. 2 is a layout of two pixels of the array substrate of the display device of FIG.
Figure 3:
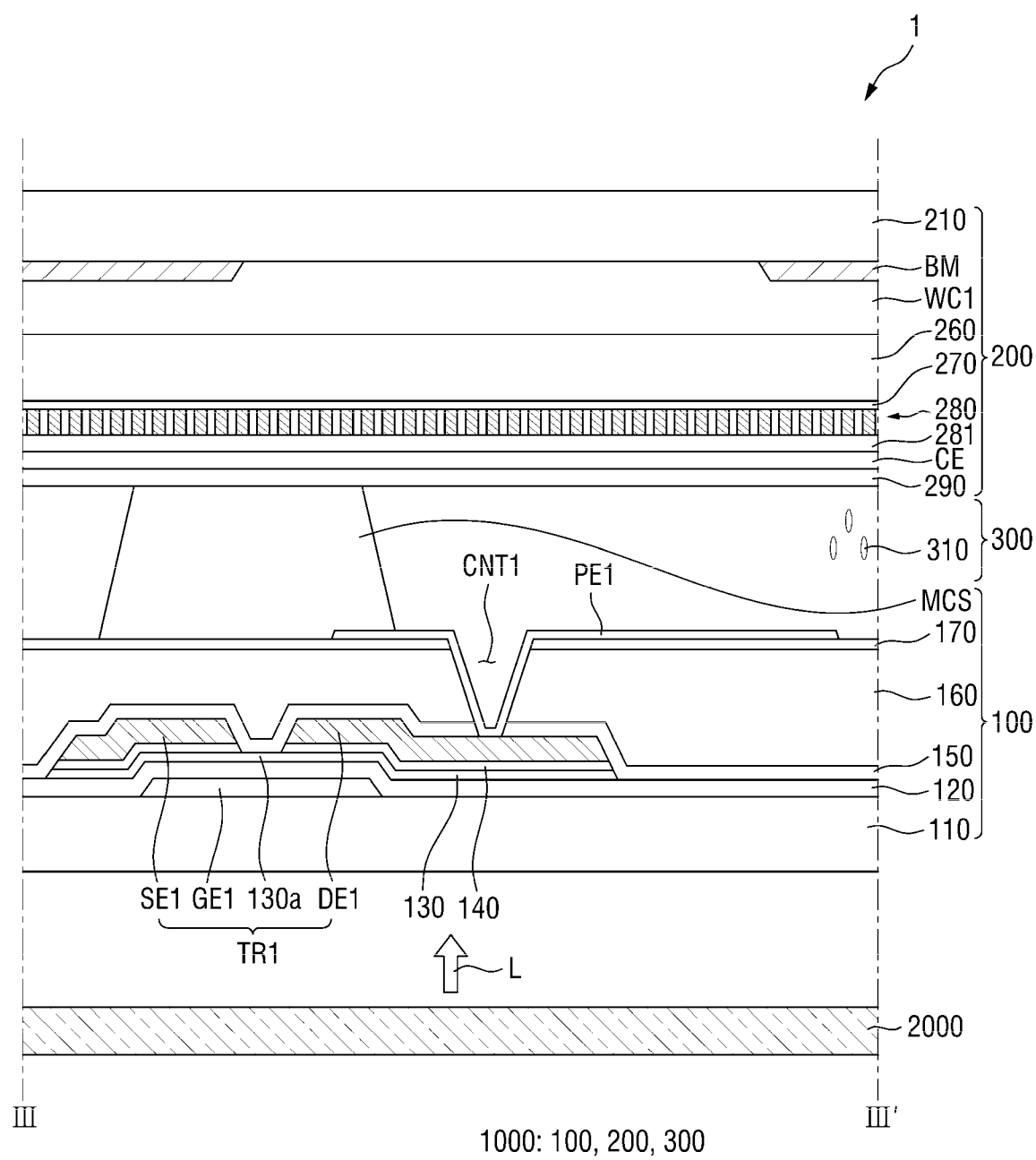
FIG. 3 is a cross-sectional view taken along a sectional line of FIG. 2.
Figure 4:
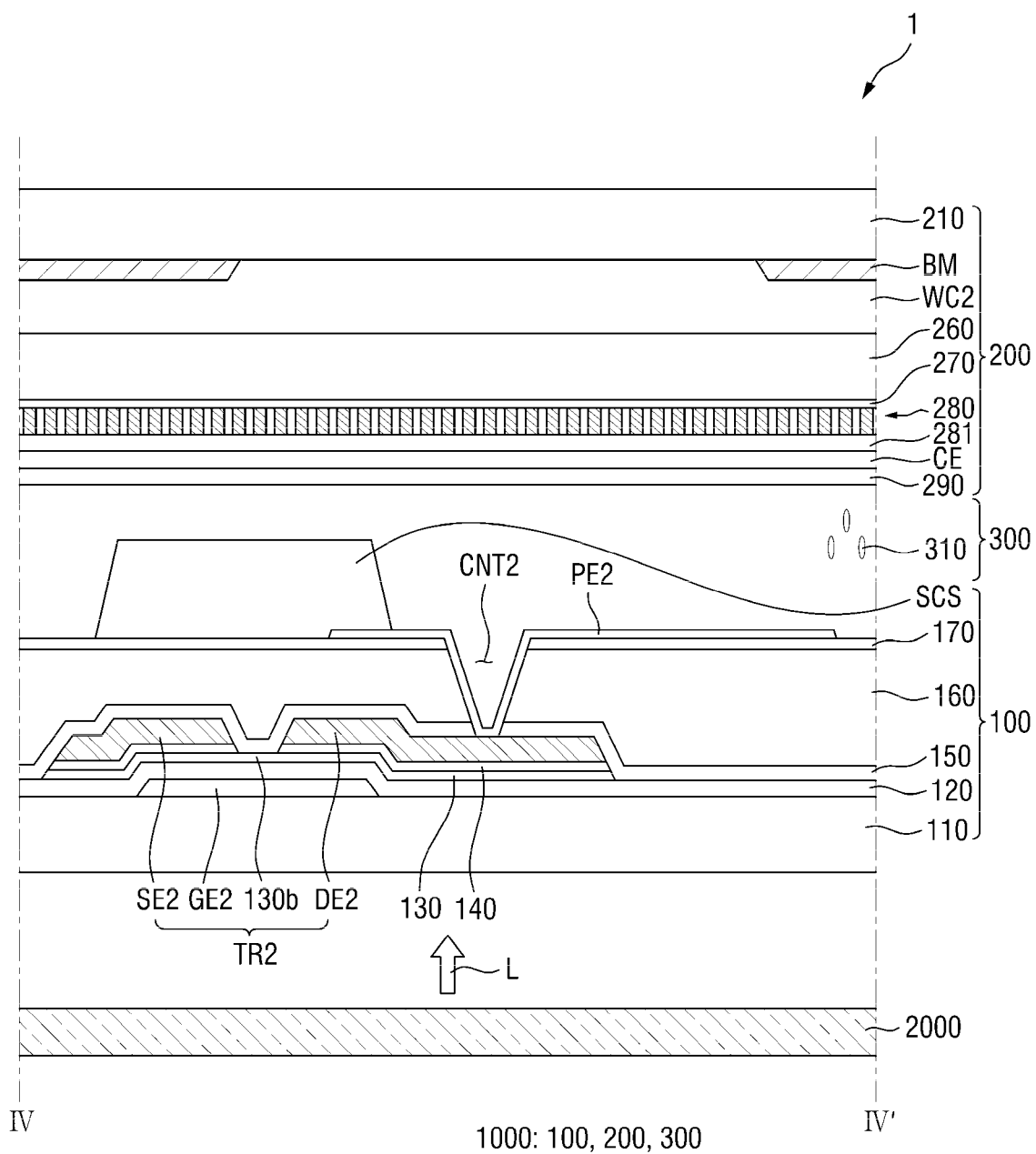
FIG. 4 is a cross-sectional view taken along a sectional line IV-IV' of FIG. 2.

FIG. 1 is a schematic plan view of an array substrate 100 of a display device 1 according to an exemplary embodiment. FIG. 2 is a layout of two adjacent pixels of the array substrate 100 of the display device 1 of FIG. 1. FIG. 3 is a cross-sectional view taken along a sectional line III-III' of FIG. 2. FIG. 4 is a cross-sectional view taken along a sectional line IV-IV' of FIG. 2.

Referring to FIGS. 1, 2, 3, and 4, the display device 1 according to the exemplary embodiment includes a display panel 1000 and a backlight unit 2000.

The display panel 1000 displays an image. The display panel 1000 may include the array substrate 100, a counter substrate 200 facing the array substrate 100, and a liquid crystal layer 300 interposed between the array substrate 100 and the counter substrate 200. The liquid crystal layer 300 may include a plurality of liquid crystal molecules 310. The array substrate 100 may be bonded to the counter substrate 200 by sealing in an exemplary embodiment.

The overall planar structure of the array substrate 100 will now be described with reference to FIG. 1.

The array substrate 100 includes a first substrate 110 in which a display area DA and a peripheral area PA around the display area DA are defined as illustrated in FIG. 1.

The display area DA may be an area which displays an image, and the peripheral area PA may be an area which does not display an image. In some exemplary embodiments, circuits (such as wires, elements, etc.) required to display an image may be located in the peripheral area PA.

In the drawing, the peripheral area PA is illustrated as being located outside the display area DA. However, the peripheral area PA is not necessarily located outside the display area DA. In addition, although the peripheral area PA is illustrated as surrounding the display area DA in plan view, it does not necessarily surround the display area DA. In some exemplary embodiments, the peripheral area PA may surround only a portion of the display area DA.

A scan driver 10 may be disposed in the peripheral area PA. The scan driver 10 may generate scan signals based on a control signal received from a timing controller (not illustrated). The scan driver 10 may provide the generated scan signals to pixels PX disposed in the display area DA. The scan driver 10 may consist of switching elements in an exemplary embodiment or may be an integrated circuit in an exemplary embodiment.

Although not illustrated in the drawing, a data driver (not illustrated) may be disposed in the peripheral area PA. The data driver may generate data signals based on a control signal and image data received from the timing controller. The data driver may provide the generated data signals to the pixels PX of the display area DA.

Referring to FIG. 2, the pixels PX may include a first pixel PX1 and a second pixel PX2 disposed adjacent to each other. The first pixel PX1 and the second pixel PX2 may receive different data signals from different data lines DL1 and DL2, respectively.

Pixels arranged in the same row may receive the same scan signal from the same scan line. For example, the first pixel PX1 and the second pixel PX2 may receive a scan signal from a first scan line SL1. Here, the first scan line SL1 is connected to the scan driver 10, receives a scan signal from the scan driver 10, and provides the scan signal to the first and second pixels PX1 and PX2. The specific configuration of each of the first and second pixels PX1 and PX2 will now be described with reference to FIGS. 3 and 4.

The specific configuration of the first pixel PX1 is illustrated in FIG. 3. First, the array substrate 100 will be described in detail based on the first pixel PX1.

The array substrate 100 may include the first substrate 110, a gate insulating layer 120, a first switching element TR1, first and second passivation films 150 and 170, an organic insulating film 160, a first pixel electrode PE1, and a main column spacer MCS.

The first substrate 110 may be a transparent insulating substrate in an exemplary embodiment. Here, the transparent insulating substrate may include a glass material, a quartz material, or a light-transmitting plastic material. In an exemplary embodiment, the first substrate 110 may be a flexible substrate or a stack of a plurality of films.

A first gate electrode GE1 may be disposed on the first substrate 110. The first gate electrode GE1 may be disposed on the same layer as scan lines including the first scan line SL1. The first gate electrode GE1 and the scan lines may be formed simultaneously by the same mask process.

The first gate electrode GE1 may be a single film, a double film, and a triple film including at least one conductive metal, two conductive metals, or three conductive metals selected from, but not limited to, aluminum (Al), copper (Cu), molybdenum (Mo), chrome (Cr), titanium (Ti), tungsten (W), moly-tungsten (MoW), moly-titanium (MoTi), and copper/moly-titanium (Cu/MoTi).

The gate insulating layer 120 may be disposed on the first gate electrode GE1. The gate insulating layer 120 may include silicon nitride or silicon oxide in an exemplary embodiment. The gate insulating layer 120 may have a multilayer structure including at least two insulating layers having different physical properties.

A semiconductor layer 130 having a first semiconductor pattern 130a may be disposed on the gate insulating layer 120.

The semiconductor layer 130 may include amorphous silicon or polycrystalline silicon in an exemplary embodiment. In an exemplary embodiment, the semiconductor layer 130 may include an oxide semiconductor. In this case, the semiconductor layer 130 may include at least one of oxide semiconductors including In—Ga-Zinc-Oxide (IGZO), ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$.

The first semiconductor pattern 130a of the semiconductor layer 130 may form a channel region of the first switching element TR1.

An ohmic contact layer 140 may be disposed on the semiconductor layer 130. The ohmic contact layer 140 may include a material such as n+ hydrogenated amorphous silicon heavily doped with an n-type impurity such as phosphorous or may include silicide. When the semiconductor layer 130 includes an oxide semiconductor, the ohmic contact layer 140 may be omitted.

A first data line DL1, a first source electrode SE1 and a first drain electrode DE1 may be disposed on the gate insulating layer 120 and the ohmic contact layer 140. The first source electrode SE1, the first drain electrode DE1 and the first semiconductor pattern 130a may be formed simultaneously by the same mask process. However, the present disclosure is not limited to this case, and the first source electrode SE1, the first drain electrode DE1 and the first semiconductor pattern 130a can be formed by different mask processes.

In the drawings, the first source electrode SE1 is U-shaped, and the first drain electrode DE1 is surrounded by the first source electrode SE1. However, the arrangement of the first source electrode SE1 and the first drain electrode DE1 is not limited to this case. The first source electrode SE1, the first drain electrode DE1, the first semiconductor pattern 130a and the first gate electrode GE1 form the first switching element TR1 described above.

The first passivation film 150 may be disposed on the first source electrode SE1 and the first drain electrode DE1. The first passivation film 150 includes an opening exposing at least a part of the first drain electrode DE1. The first passivation film 150 may include an inorganic insulating material such as silicon nitride or silicon oxide in an exemplary embodiment. The first passivation film 150 may prevent or reduce a pigment of the organic insulating film 160, which will be described later, from flowing into the first semiconductor pattern 130a.

The organic insulating film 160 may be disposed on the first passivation film 150. The organic insulating film 160 overlaps the opening of the first passivation film 150 and includes an opening exposing at least a part of the first drain electrode DE1. The organic insulating film 160 may include an organic material having excellent or improved planarization characteristics and photosensitivity.

The second passivation film 170 may be disposed on the organic insulating film 160. The second passivation film 170 may include an inorganic insulating material such as silicon nitride or silicon oxide in an exemplary embodiment. The second passivation film 170 can be omitted.

The opening of the first passivation film 150, the opening of the organic insulating film 160, and an opening of the second passivation film 170 may form a first contact hole CNT1.

The first pixel electrode PE1 may be disposed on the second passivation film 170. The first pixel electrode PE1 may include a transparent conductive material. Here, the transparent conductive material may include polycrystalline, monocrystalline or amorphous indium tin oxide (ITO).

The main column spacer MCS may be disposed on the second passivation film 170. In some exemplary embodiments, the main column spacer MCS may overlap the first pixel electrode PE1 and may be disposed on the first pixel electrode PE1.

The main column spacer MCS may maintain a gap between the array substrate 100 and the counter substrate 200 and may directly contact a lower surface of the counter substrate 200.

The first pixel electrode PE1 may directly contact the first drain electrode DE1 exposed through the first contact hole CNT1. In addition, the first pixel electrode PE1 is overlapped by a common electrode CE.

Next, the counter substrate 200 will be described.

In an exemplary embodiment, the counter substrate 200 may include a second substrate 210, a black matrix BM, a first wavelength conversion pattern WC1, a planarization layer 260, an insulating layer 270, a polarizing layer 280, the common electrode CE, and an alignment film 290.

In an exemplary embodiment, the counter substrate 200 may not include the first wavelength conversion pattern WC1, the planarization layer 260, the insulating layer 270, and the polarizing layer 280. In this case, the array substrate 100 may further include a color filter.

The counter substrate 200 is placed to face the array substrate 100. The second substrate 210 may include transparent glass or plastic and, in an exemplary embodiment, may include the same material as the first substrate 110.

The black matrix BM may be disposed on the second substrate 210. The black matrix BM is disposed at a boundary between pixels and prevents or reduces color mixing between neighboring pixels by blocking transmission of light.

The first wavelength conversion pattern WC1 may be disposed on the black matrix BM. The first wavelength conversion pattern WC1 may be in contact with a lower surface of the second substrate 210 exposed through a space between portions of the black matrix BM. The first wavelength conversion pattern WC1 may overlap the first pixel electrode PE1 in a direction perpendicular to the array substrate 100.

The first wavelength conversion pattern WC1 may include a material that can convert or shift a wavelength band of light incident from the outside. Accordingly, the first wavelength conversion pattern WC1 may emit light of a display color different from that of light incident from the outside.

For example, the first wavelength conversion pattern WC1 may receive light L having a specific wavelength band from the backlight unit 2000 which will be described later and may emit the light L after converting or shifting a center wavelength of the light L. In an exemplary embodiment, the first wavelength conversion pattern WC1 may receive blue light having a center wavelength of about 420 nm to about 480 nm from the backlight unit 2000 and convert the blue light into red light having a center wavelength of about 600 nm to about 670 nm.

The first wavelength conversion pattern WC1 may include a wavelength conversion material. The wavelength conversion material may be a material that converts the light L having the specific wavelength band into light having a different wavelength band. In an exemplary embodiment, the wavelength conversion material may include quantum dots.

The planarization layer 260 may be disposed on the first wavelength conversion pattern WC1. The planarization layer 260 may provide flatness to the polarizing layer 280 which will be described later.

The insulating layer 270 may be disposed on the planarization layer 260. The insulating layer 270 may be formed of at least one layer having an insulating inorganic material. The insulating layer 270 may prevent or reduce damage to the planarization layer 260 in the process of forming the polarizing layer 280 as will be described below. The insulating layer 270 can be omitted.

The polarizing layer 280 may be disposed on the insulating layer 270. The polarizing layer 280 may be a wire grid polarizer in an exemplary embodiment. The polarizing layer 280 may include wire grid patterns. The wire grid patterns may include, in an exemplary embodiment, a conductive material through which a current flows. FIG. 3 illustrates that the polarizing layer 280 includes a single wire grid pattern, but the present disclosure is not limited to this case. The polarizing layer 280 may include the plurality of wire grid patterns having at least two pattern layers stacked.

A capping layer 281 may be disposed on the polarizing layer 280. The capping layer 281 may be disposed directly on the wire grid patterns of the polarizing layer 280 to cover and protect the wire grid patterns of the polarizing layer 280.

The common electrode CE may be disposed on the capping layer 281. At least a part of the common electrode CE may overlap the first pixel electrode PE1. The common electrode CE may be in the form of a whole plate in an exemplary embodiment.

The alignment film 290 may be disposed on the common electrode CE. The alignment film 290 may induce the initial alignment of the liquid crystal molecules 310 in the liquid crystal layer 300. In an exemplary embodiment, the alignment film 290 may include a polymer organic material having an imide group in a repeating unit of a main chain.

Next, the liquid crystal layer 300 will be described. The liquid crystal layer 300 includes the initially aligned liquid crystal molecules 310. The liquid crystal molecules 310 may have negative dielectric anisotropy and may be vertically aligned in an initial alignment state. The liquid crystal molecules 310 may have a predetermined pretilt angle in the initial alignment state. The initial alignment of the liquid crystal molecules 310 may be induced by the alignment film 290. When an electric field is formed between the array substrate 100 and the counter substrate 200, the liquid crystal molecules 310 may tilt or rotate in a specific direction, thereby changing the polarization state of light transmitted through the liquid crystal layer 300.

The backlight unit 2000 may be disposed below the display panel 1000. The backlight unit 2000 provides light to the display panel 1000. More specifically, the backlight unit 2000 may be disposed below the display panel 1000 to provide the display panel 1000 with the light L having the specific wavelength band. In an exemplary embodiment, the light L having the specific wavelength band may be blue light having a center wavelength of about 420 nm to about 480 nm. The center wavelength may also be expressed as a peak wavelength. In other words, the light L having the specific wavelength band may also be defined as blue light whose center wavelength is in the range of about 420 nm to about 480 nm. That is, the backlight unit 2000 may provide blue light to the display panel 1000. The display panel 1000 is disposed on the path of the light L having the specific wavelength band emitted from the backlight unit 2000 and displays an image based on the received light L. As long as the display panel 1000 is disposed on the path of light provided from the backlight unit 2000, the arrangement relationship between the display panel 1000 and the backlight unit 2000 is not limited to that illustrated in FIG. 3 or 4.

The second pixel PX2 will now be described with reference to FIG. 4. A description of elements identical to those of the first pixel PX1 will be omitted or given briefly, and the following description will focus mainly on differences from the first pixel PX1.

In the second pixel PX2, a sub-column spacer SCS may be disposed on the second passivation film 170.

Compared to the main column spacer MCS, the sub-column spacer SCS may be spaced apart from the counter substrate 200 by a predetermined distance. In other words, a height of the sub-column spacer SCS may be smaller than a height of the main column spacer MCS. Accordingly, the gap between the array substrate 100 and the counter substrate 200 may be maintained primarily by the main column spacer MCS. When pressure is applied to the display device 1, the sub-column spacer SCS may provide additional support to maintain the gap between the array substrate 100 and the counter substrate 200.

A second wavelength conversion pattern WC2 may be disposed in the counter substrate 200 of the second pixel PX2. The second wavelength conversion pattern WC2 may overlap a second pixel electrode PE2 in the direction perpendicular to the array substrate 100.

Compared to the first wavelength conversion pattern WC1, the second wavelength conversion pattern WC2 also receives the light L having the specific wavelength band from the backlight unit 2000 and emits the light L after converting or shifting the center wavelength of the light L. The first wavelength conversion pattern WC1 and the second wavelength conversion pattern WC2 convert or shift the light L into light having different wavelengths. For example, when the first wavelength conversion pattern WC1 receives blue light and converts the blue light into red light, the second wavelength conversion pattern WC2 may receive the blue light and convert the blue light into green light.

According to the exemplary embodiments, the first wavelength conversion pattern WC1 and/or the second wavelength conversion pattern WC2 may be a light transmission pattern. Compared to the first and second wavelength conversion patterns WC1 and WC2, the light transmission pattern may transmit the light L having the specific wavelength band without wavelength conversion. For example, the light transmission pattern may receive blue light and emit the blue light as it is without wavelength conversion.

A spacer SC disposed in the peripheral area PA of the display device 1 will now be described with reference to FIGS. 5, 6, 7, and 8.

Figure 5:
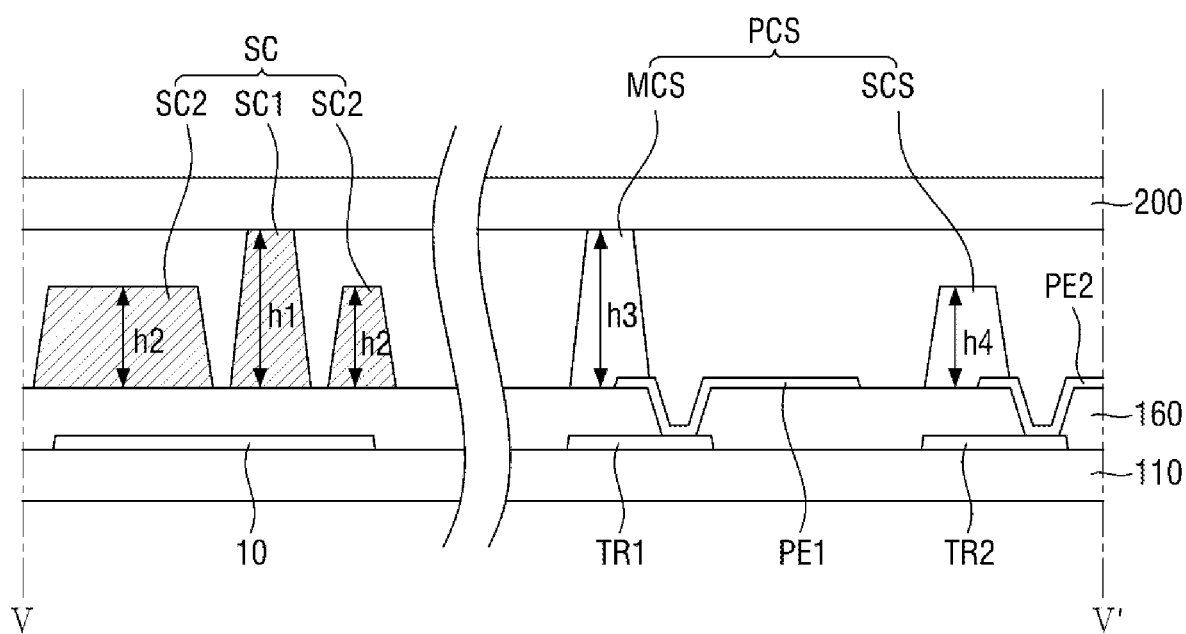
FIG. 5 is a cross-sectional view taken along a sectional line V-V' of FIG. 1.
Figure 6:
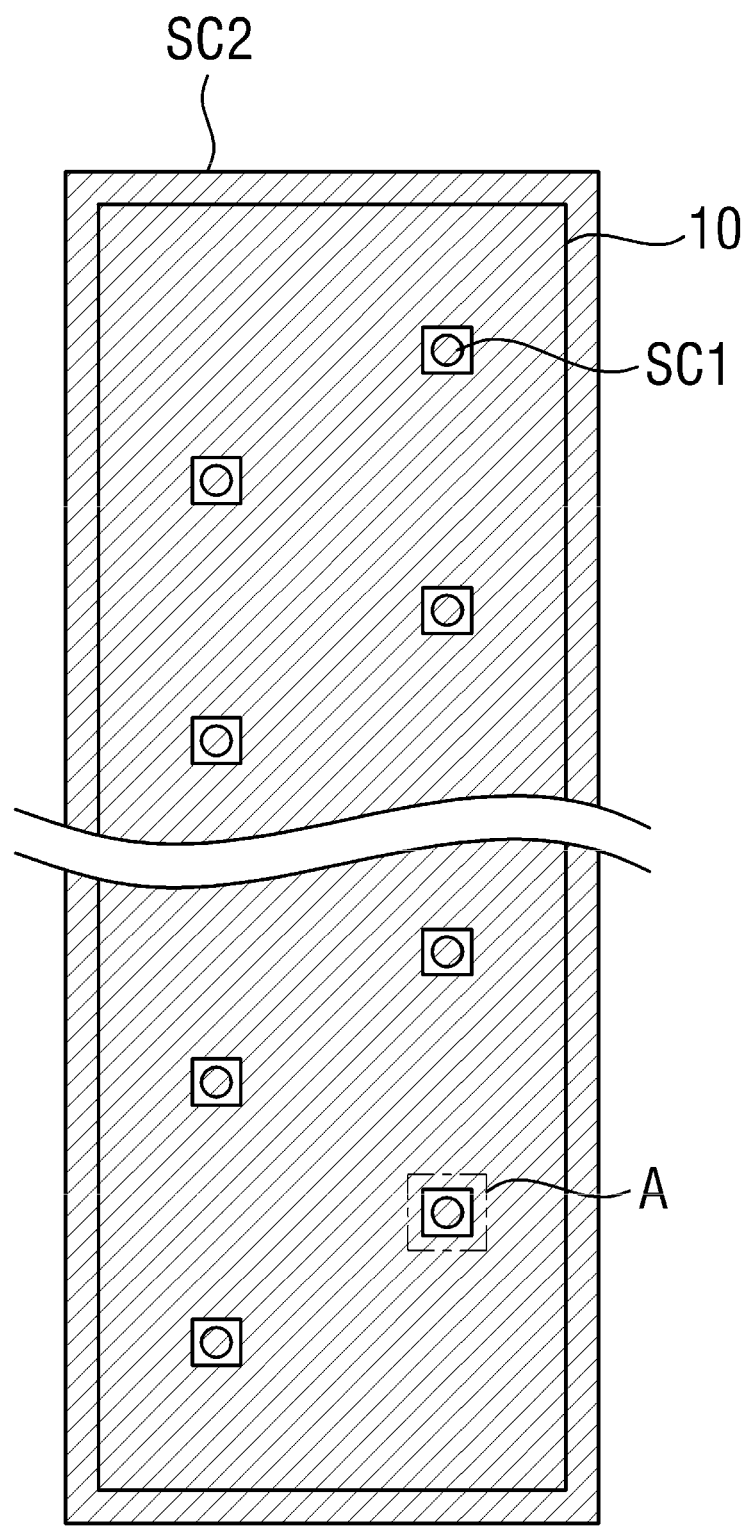
FIG. 6 is a schematic plan view illustrating the relationship between a scan driver and a spacer.
Figure 7:
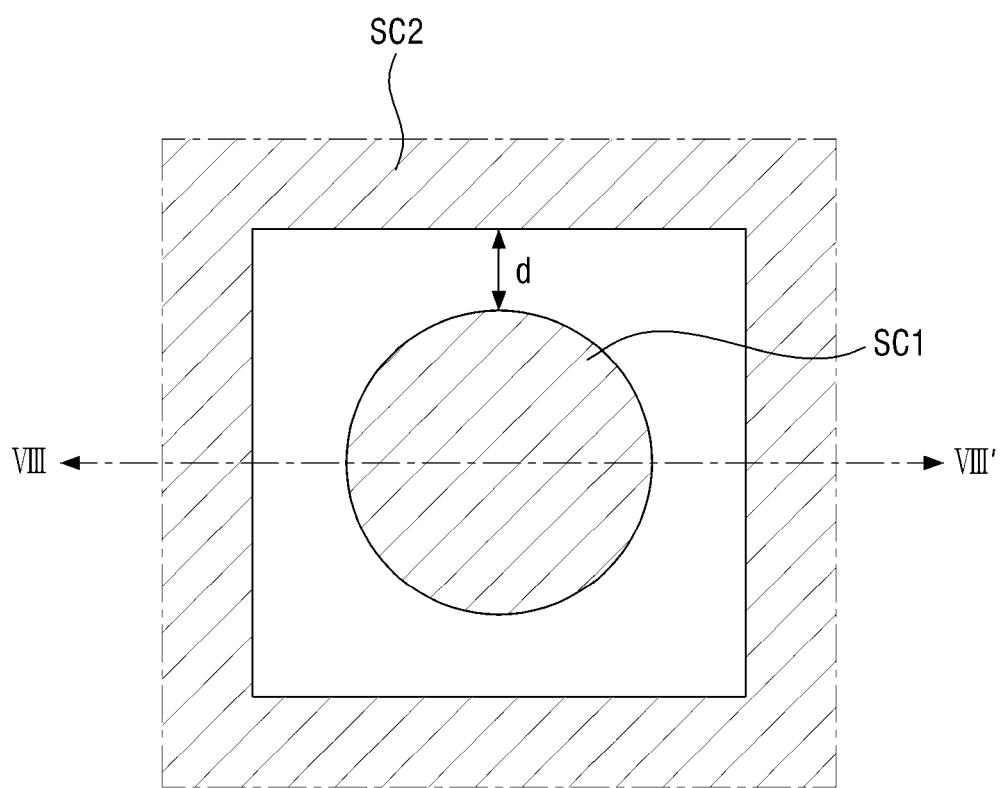
FIG. 7 is an enlarged view of an area A of FIG. 6.
Figure 8:
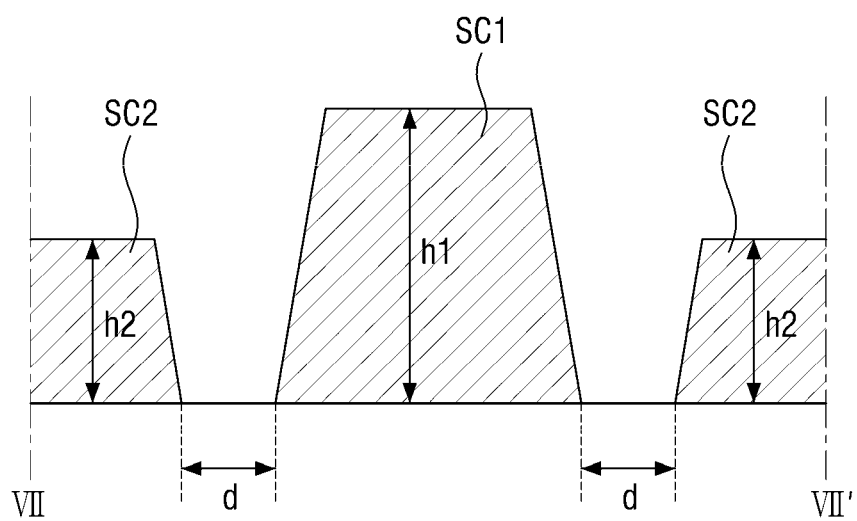
FIG. 8 is a cross-sectional view taken along a sectional line VIII-VIII' of FIG. 7.

FIG. 5 is a cross-sectional view taken along a sectional line V-V' of FIG. 1. FIG. 6 is a schematic plan view illustrating the relationship between the scan driver 10 and the spacer SC. FIG. 7 is an enlarged view of an area A of FIG. 6. FIG. 8 is a cross-sectional view taken along a sectional line VIII-VIII' of FIG. 7.

Referring to FIGS. 5, 6, 7, and 8, the display device 1 may further include the spacer SC which is disposed above the scan driver 10 overlapping the scan driver 10. As described above, the scan driver 10 may consist of switching elements such as the first and second switching elements TR1 and TR2. In an exemplary embodiment, the scan driver 10 may have an amorphous silicon gate (ASG) structure.

The spacer SC includes a first spacer SC1 and a second spacer SC2 which have different heights and are spaced apart from each other. The first and second spacers SC1 and SC2 may be formed simultaneously by the same mask process using a half-tone mask.

The first spacer SC1 may be placed to contact the counter substrate 200. The first spacer SC1 may have the same height as the main column spacer MCS. In other words, a height h1 of the first column spacer SC1 may be equal to a height h3 of the main column spacer MCS.

The second spacer SC2 is spaced apart from the lower surface of the counter substrate 200 by a predetermined distance. A height h2 of the second spacer SC2 is smaller than the height h1 of the first spacer SC1. In an exemplary embodiment, the height h2 of the second spacer SC2 may be equal to a height h4 of the sub-column spacer SCS. Alternatively, the height h2 of the second spacer SC2 and the height h4 of the sub-column spacer SCS may be different from each other. Both the second spacer SC2 and the sub-column spacer SCS are not in contact with the counter substrate 200.

The first spacer SC1 may perform a function similar to that of the main column spacer MCS. That is, the first spacer SC1 may maintain the gap between the array substrate 100 and the counter substrate 200. In addition, the second spacer SC2 may perform a function similar to that of the sub-column spacer SCS. That is, the second spacer SC2 may maintain the gap between the array substrate 100 and the counter substrate 200 when pressure is applied to the display device 1.

A difference between the height h1 of the first spacer SC1 and the height h2 of the second spacer SC2 may be about 0.3 μm to about 0.7 μm. In an exemplary embodiment, the difference between the height h1 of the first spacer SC1 and the height h2 of the second spacer SC2 may be about 0.5 μm.

If the difference between the height h1 of the first spacer SC1 and the height h2 of the second spacer SC2 is about 0.3 μm or more, the function of the second spacer SC2 may be clearly distinguished from that of the first spacer SC1. That is, as described above, the second spacer SC2 may provide additional support to maintain the gap between the array substrate 100 and the counter substrate 200 when pressure is applied to the display device 1. However, if the heights h1 and h2 of the first and second spacers SC1 and SC2 are similar to each other, the second spacer SC2 has a function similar to that of the first spacer SC1. In this regard, the difference between the heights h1 and h2 of the first and second spacers SC1 and SC2 may be about 0.3 μm or more.

If the difference between the height h1 of the first spacer SC1 and the height h2 of the second spacer SC2 is about 0.7 μm or less, the second spacer SC2 can sufficiently provide additional support maintain the gap between the array substrate 100 and the counter substrate 200 when pressure is applied to the display device 1.

The first spacer SC1 is spaced apart from the second spacer SC2. The first spacer SC1 and the second spacer SC2 disposed in the peripheral area PA are spaced apart from each other, as are the main column spacer MCS and the sub-column spacer SCS disposed in the display area DA.

Generally, compression characteristics of the spacer SC and a column spacer PCS when external pressure is applied to the display device 1 depend on surface area of the spacer SC and the column spacer PCS. For example, increasing the surface area of the spacer SC may decrease the degree of compression. In other words, increasing the surface area of the spacer SC may provide better support to maintain the gap between the array substrate 100 and the counter substrate 200 under the application of the pressure.

According to an embodiment, if the first spacer SC1 and the second spacer SC2 are connected to each other, they may have compression characteristics different from those of the main column spacer MCS and the sub-column spacer SCS spaced apart from each other. In this case, if pressure is applied to the display device 1, the gap between the array substrate 100 and the counter substrate 200 may be reduced more in the display area DA than in the peripheral area PA. Therefore, the display area DA and the peripheral area PA may be compressed to different degrees.

On the other hand, According to the exemplary embodiments, the first spacer SC1 and the second spacer SC2 are spaced apart from each other, and they may have compression characteristics similar to those of the main column spacer MCS and the sub-column spacer SCS in the display area DA. In this case, the compression characteristics of the display area DA and the peripheral area PA may be similar. Therefore, the gap between the array substrate 100 and the counter substrate 200 may be maintained constant or substantially consistent in the entire area of the display device 1.

The first spacer SC1 may be column-shaped and may be disposed on the scan driver 10 to have a predetermined pattern in plan view. In an exemplary embodiment, when first spacers SC1 are arranged along a first column and a second column, they may be alternately arranged so the first spacers SC1 arranged along a first column and the first spacers SC1 arranged along a second column may be staggered in the row direction. In an exemplary embodiment, the first spacers SC1 may be arranged in a matrix. The first spacers SC1 may have various arrangements as long as the gap between the array substrate 100 and the counter substrate 200 can be maintained in the peripheral area PA of the display device 1.

The second spacer SC2 may cover most of the scan driver 10 in plan view. That is, most of the scan driver 10 may be overlapped by the second spacer SC2.

In an exemplary embodiment, the second spacer SC2 may cover most of the scan driver 10 and extend further outward. Edges of the second spacer SC2 may be disposed outside edges of the scan driver 10. However, the present disclosure is not limited to this case, and the edges of the second spacer SC2 may be substantially aligned with the edges of the scan driver 10.

In plan view, the first spacer SC1 may be formed in a circular shape, and the second spacer SC2 may surround the first spacer SC1 in a quadrilateral shape. In other words, inner walls of the second spacer SC2 may have a quadrilateral shape in plan view, and the circular first spacer SC1 may be disposed inside the inner walls of the second spacer SC2. However, the shapes of the first spacer SC1 and the second spacer SC2 are not limited to this example and will be described later with reference to FIGS. 9 and 10.

An overlap ratio of the scan driver 10 and the spacer SC may be about 80% or more. That is, the spacer SC may cover about 80% or more of the scan driver 10.

When the spacer SC overlaps about 80% or more of the total area of the scan driver 10, it can sufficiently prevent or reduce reflected light from entering the scan driver 10.

Specifically, the spacer SC, that is, the first spacer SC1 and the second spacer SC2 may prevent the light L of the backlight unit 2000 reflected by the polarizing layer 280 of the counter substrate 200 from being incident on the scan driver 10. In particular, since the second spacer SC2 covers most of the area of the scan driver 10, it can more reliably prevent or reduce light reflected by the polarizing layer 280 from being incident on the scan driver 10.

The light transmittance of the spacer SC may be about 10% or less. In particular, the light transmittance of the spacer SC for blue light having a center wavelength of about 420 nm to about 480 nm may be about 10% or less. Specifically, of the light L emitted from the backlight unit 2000, about 90% or more of the light reflected by the polarizing layer 280 to the scan driver 10 may be blocked or absorbed by the spacer SC.

The switching elements constituting the scan driver 10 may easily deteriorate when exposed to external light. For example, when the light L of the backlight unit 2000 reflected by the polarizing layer 280 enters the scan driver 10, the switching elements of the scan driver 10 may deteriorate. Thus, the durability of the display device 1 may be reduced.

The spacer SC may block or absorb such reflected light from entering the scan driver 10, thereby preventing or reducing the deterioration of the scan driver 10 and improving the durability of the display device 1. When the light transmittance of the spacer SC is about 10% or less, the deterioration of the scan driver 10 due to reflected light can be sufficiently prevented or reduced.

The spacer SC may include a color that can effectively block the wavelength band of the light L emitted from the backlight unit 2000. In an exemplary embodiment, when the backlight unit 2000 emits blue light L having a center wavelength of about 420 nm to about 480 nm, the spacer SC may be formed to have a red, orange, yellow, or black color. However, the color of the spacer SC is not particularly limited as long as it is a color suitable for blocking light from entering the scan driver 10.

In some exemplary embodiments, the spacer SC may include a pigment that absorbs blue light. The spacer SC may absorb blue light having a central wavelength of about 420 nm to about 480 nm.

The pigment may include at least one of a red pigment, an orange pigment and a yellow pigment. Specifically, the pigment may include at least one of compounds represented by formulas 1, 2, 3, 4, 5, 6, 7, and 8.

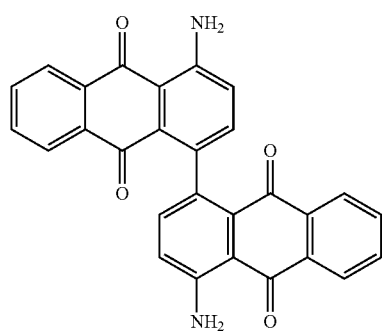

(1)

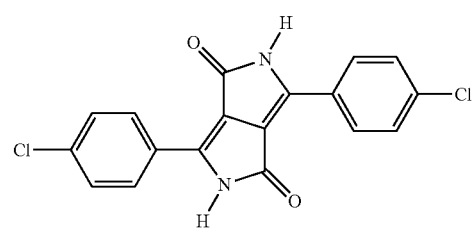

(2)

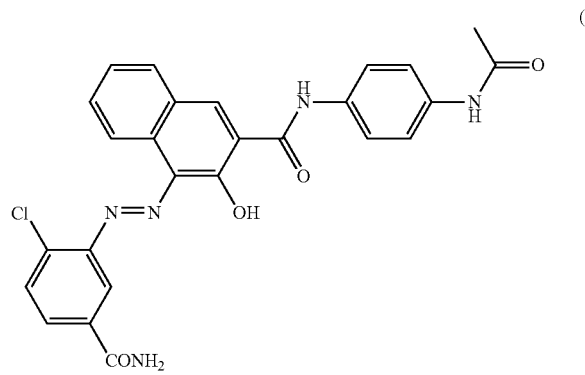

(3)

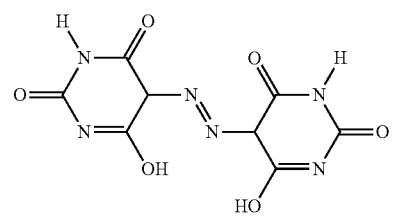

(4)

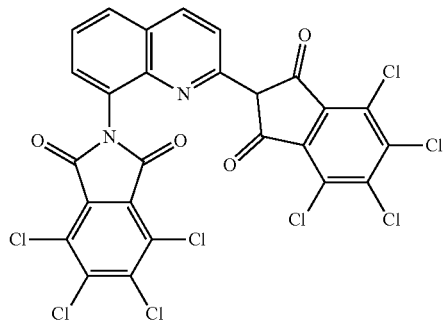

(5)

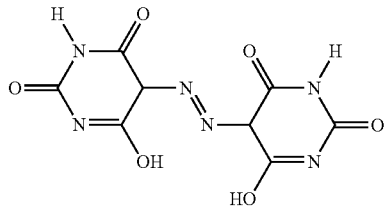

(6)

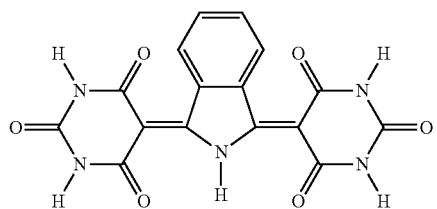

(7)

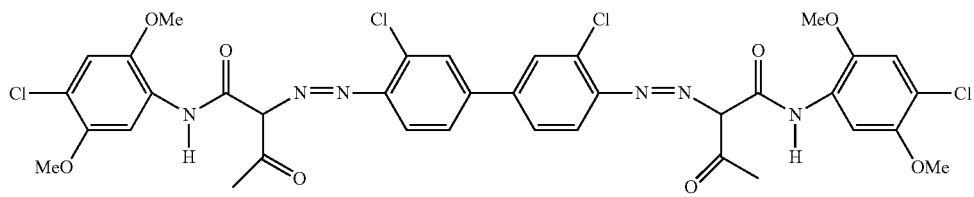

(8)

In addition, although the pigment that absorbs blue light has been described herein, the present disclosure is not limited to this case. According to the exemplary embodiments, the spacer SC may include a pigment that absorbs red light and/or a pigment that absorbs green light. This is to prevent or reduce color mixing between adjacent pixels. For example, the pigment may include a compound represented by formula 9 or a compound represented by formula 10.

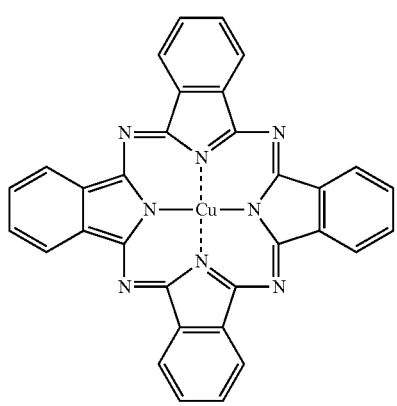

(9)

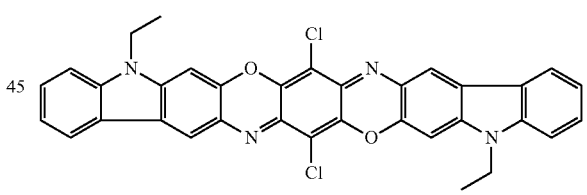

(10)

The pigment may be contained in an amount of about 5% to 30% by weight of the total content of the spacer SC. If the pigment is contained in an amount of less than about 5% by weight, the absorption of blue light may be insignificant. If the pigment is contained in an amount of more than about 30% by weight, the reliability of the process of manufacturing the spacer SC may be reduced. Particularly, if the pigment is excessively contained, there is a possibility that an etching process for forming a spacer will not be precisely performed.

According to a comparable embodiments, a generic spacer includes a transparent material. According to the exemplary embodiments, the spacer SC includes a pigment to absorb blue light directed toward the scan driver 10 while maintaining the gap of the liquid crystal layer 300. This can prevent or reduce the deterioration of the characteristics of the scan driver 10 or the deterioration of the characteristics of the switching elements included in the scan driver 10.

A distance d between the first spacer SC1 and the second spacer SC2 may be about 10 μm to about 30 μm, preferably, about 15 μm to about 25 μm. In an exemplary embodiment, the distance d between the first spacer SC1 and the second spacer SC2 may be about 20 μm. Here, the distance d refers to a shortest distance between the first spacer SC1 and the second spacer SC2.

If the distance d between the first spacer SC1 and the second spacer SC2 is too small, they may come into contact with each other when pressure is applied to the display device 1. Therefore, it may be difficult for the first and second spacers SC1 and SC2 to fully perform their function as spacers. If the distance d between the first spacer SC1 and the second spacer SC2 is too large, reflected light may enter into the scan driver 10 through the space between the first spacer SC1 and the second spacer SC2. Therefore, the light blocking rate of the spacer SC may be reduced. In this regard, the distance d between the first spacer SC1 and the second spacer SC2 may satisfy the above range.

The first spacer SC1 and the second spacer SC2 may perform a spacer function for maintaining the gap between the array substrate 100 and the counter substrate 200 and a function for blocking reflected light from entering the scan driver 10. Therefore, there is no need to form a light blocking layer for blocking light from entering the scan driver 10. This simplifies the manufacturing process and reduces cost.

Exemplary embodiments of the spacer SC will now be described. In the following embodiments, a description of elements identical to those of the above-described embodiment will be omitted or given briefly, and the following description will focus mainly on differences from the above-described embodiment.

Figure 9:
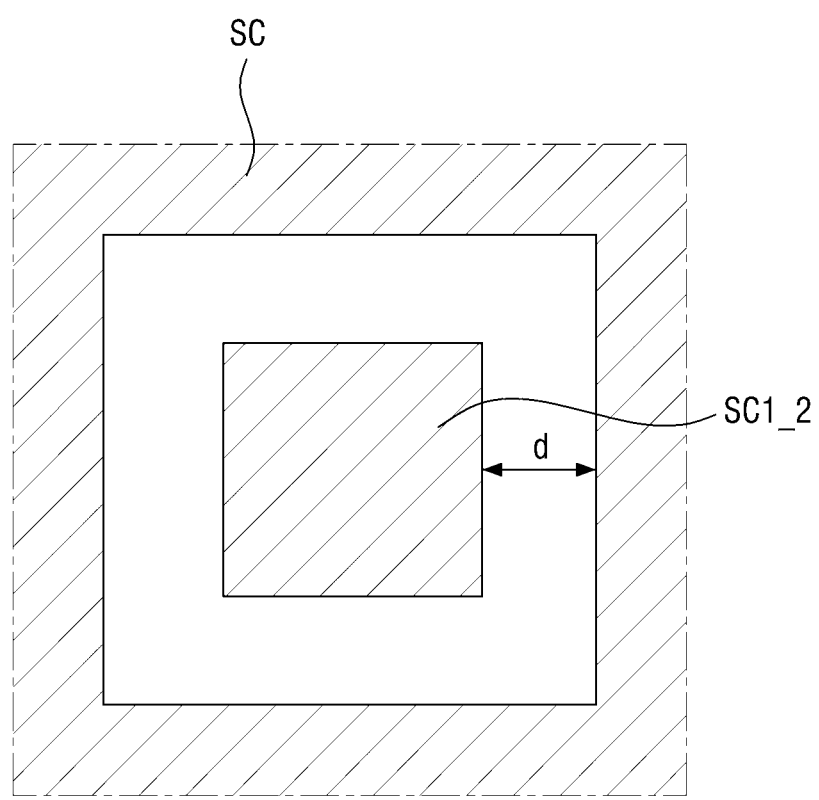
FIGS. 9 and 10 are enlarged views of areas of spacers according to exemplary embodiments which correspond to the area A of FIG. 6.
Figure 10:
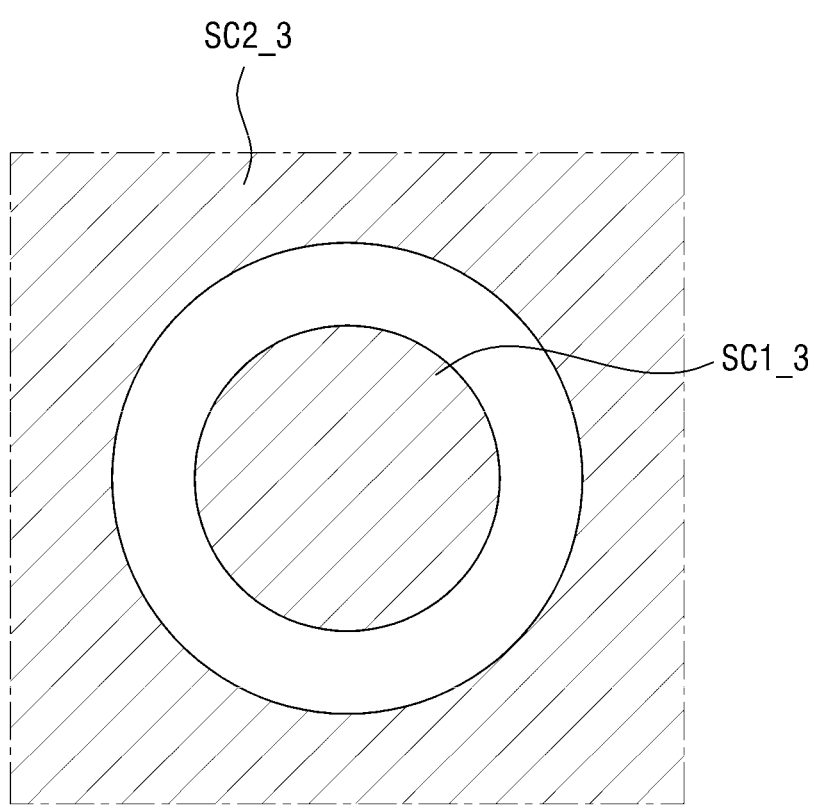

FIGS. 9 and 10 are enlarged views of areas of spacers according to exemplary embodiments which correspond to the area A of FIG. 6.

Referring to FIG. 9, in plan view, a first spacer SC1_2 may be formed in a quadrilateral shape. Here, a distance d between the first spacer SC1_2 and a second spacer SC2_2 may have substantially the same range as the distance d between the first spacer SC1 and the second spacer SC2 according to the above-described embodiment.

Referring to FIG. 10, in plan view, a first spacer SC1_3 may be formed in a circular shape, and a second spacer SC2_3 may also be formed in a circular shape to surround the first spacer SC1_3. In other words, an inner wall of the second spacer SC2_3 may be circular in plan view. A space between the first spacer SC1_3 and the second spacer SC2_3 may be similar to a ring shape.

A distance d between the first spacer SC1_3 and the second spacer SC2_3 may also have substantially the same range as the distance d between the first spacer SC1 and the second spacer SC2 according to the above-described embodiment.

Figure 11:
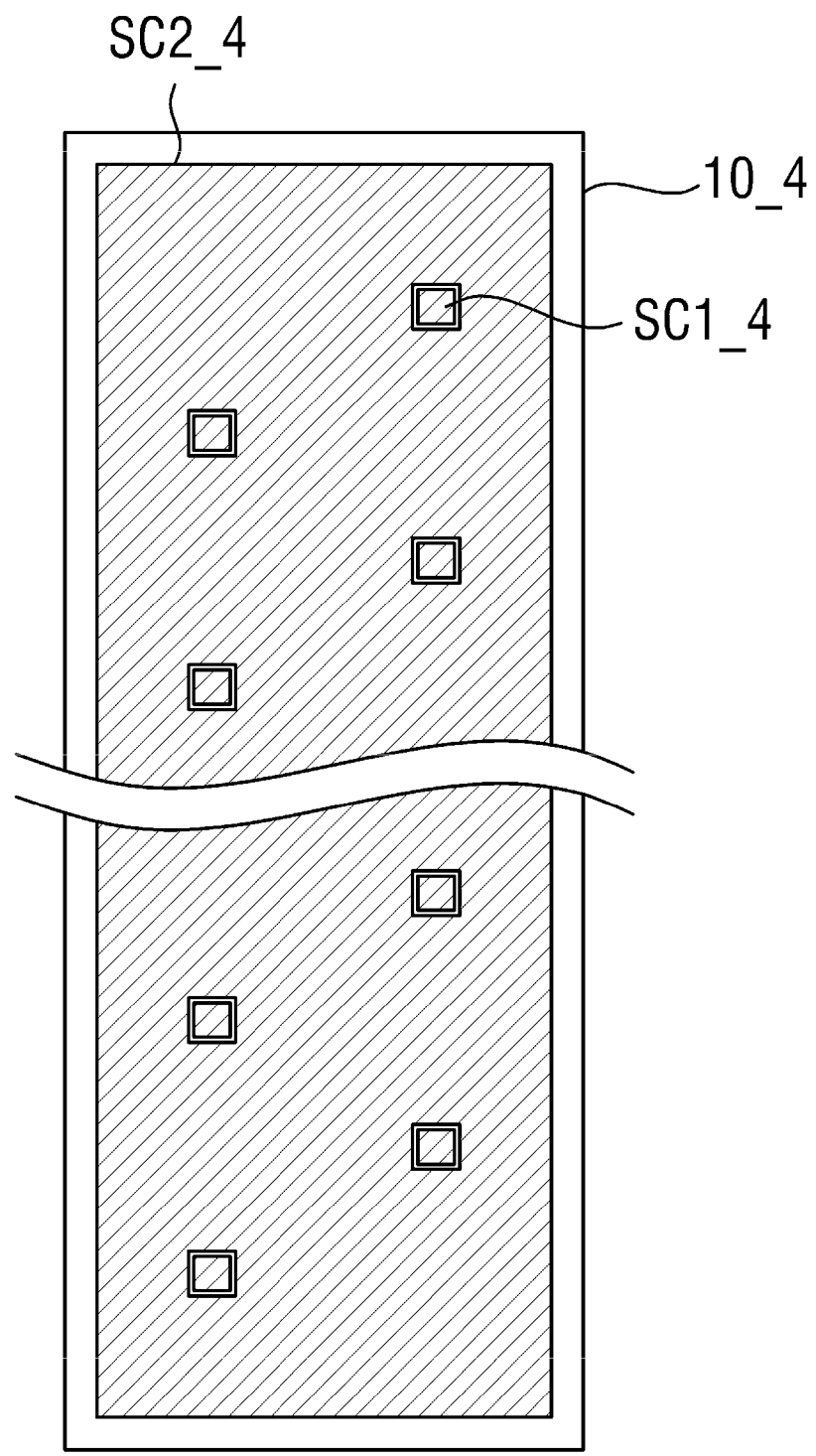
FIGS. 11 and 12 are schematic plan views illustrating the relationship between a scan driver and a spacer according to exemplary embodiments.
Figure 12:
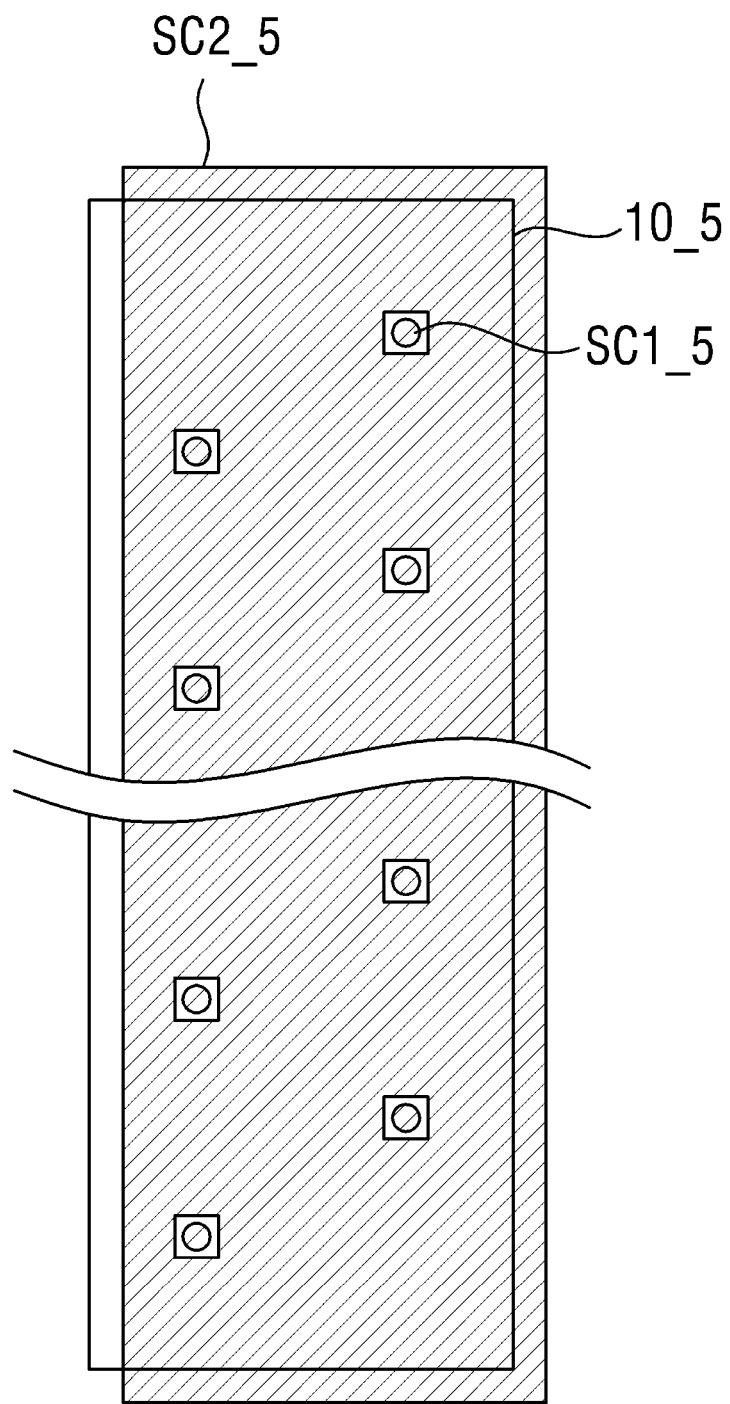

FIGS. 11 and 12 are schematic plan views illustrating the relationship between a scan driver and a spacer according to exemplary embodiments.

Referring to FIG. 11, edges of a second spacer SC2_4 may be disposed within edges of a scan driver 10_4.

Referring to FIG. 12, one long edge and both short edges of a second spacer SC2_5 may be disposed outside edges of a scan driver 10_5, but the other long edge of the second spacer SC2_5 may be disposed within the corresponding edge of the scan driver 10_5 on the scan driver 10_5.

The edges of the second spacer SC2_4 or SC2_5 can be disposed freely with respect to the edges of the scan driver 10_4 or 10_5 as long as the first spacer SC1_4 or SC1_5 and the second spacer SC2_4 or SC2_5 cover about 80% or more of the area of the scan driver 10_4 or 10_5.

According to exemplary embodiments of the present disclosure, a step difference between a display area and a peripheral area is removed or reduced. Therefore, an edge stain defect can be reduced.

In addition, since the process of manufacturing a display device is simplified, the cost can be reduced, and the manufacturing time can be shortened.

The effects of the present invention are not limited by the foregoing, and other various effects are anticipated herein.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a base substrate comprising a display area and a peripheral area;
a scan driver disposed on the peripheral area of the base substrate; and
a spacer overlapping the scan driver,
wherein the spacer comprises a first spacer and a second spacer which are spaced apart from each other and have different heights,
wherein the first spacer is directly surrounded by an inner wall of the second spacer, and
wherein, in a plan view, a first long edge and both short edges of the second spacer are disposed outside edges of the scan driver, and a portion of a second long edge of the second spacer is disposed within a corresponding edge of the scan driver on the scan driver.

2. The display device of claim 1, further comprising:
a counter substrate facing the base substrate and is spaced apart from the base substrate,
wherein the spacer is configured to maintain a gap between the base substrate and the counter substrate.

3. The display device of claim 2, wherein the first spacer contacts the counter substrate, and
wherein the second spacer is spaced apart from the counter substrate.

4. The display device of claim 2, wherein the counter substrate comprises a wavelength conversion pattern.

5. The display device of claim 1, wherein a height of the first spacer is greater than a height of the second spacer.

6. The display device of claim 5, wherein a difference between a height of the first spacer and a height of the second spacer is greater than or equal to 0.3 μm and less than or equal to 0.7 μm.

7. The display device of claim 5, wherein a planar area of the second spacer is larger than a planar area of the first spacer.

8. The display device of claim 1, wherein the spacer overlaps about 80% or more of a planar area of the scan driver.

9. The display device of claim 8, wherein at least one side of the spacer is disposed outside a side of the scan driver.

10. The display device of claim 1, wherein a distance between the first spacer and the second spacer in plan view is greater than or equal to 10 μm and less than or equal to 30 μm.

11. The display device of claim 1, wherein the spacer blocks blue light having a center wavelength of about 420 nm to about 480 nm.

12. The display device of claim 11, wherein light transmittance of the spacer is about 10% or less.

13. The display device of claim 1, wherein a first portion of the second long edge of the second spacer is disposed within a corresponding edge of the scan driver on the scan driver, and a second portion of the second long edge of the second spacer that is substantially less than the first portion is disposed outside the corresponding edge of the scan driver on the scan driver.

14. A display device comprising:
- a base substrate comprising a display area and a peripheral area;
- a counter substrate facing the base substrate;
- a column spacer disposed on the display area of the base substrate;
- a scan driver disposed on the peripheral area of the base substrate; and
- a spacer disposed on the peripheral area of the base substrate, the spacer overlapping the scan driver,
- wherein the column spacer comprises a main column spacer and a sub-column spacer which are spaced apart from each other and have different heights,
- wherein the spacer comprises a first spacer and a second spacer, the first spacer being directly disposed within inner walls of the second spacer and which are spaced apart from the inner walls of the second spacer,
- wherein the first spacer and the second spacer have different heights, and
- wherein, in a plan view, a first long edge and both short edges of the second spacer are disposed outside edges of the scan driver, and a portion of a second long edge of the second spacer is disposed within a corresponding edge of the scan driver on the scan driver.

15. The display device of claim 14, wherein the main column spacer and the first spacer contact the counter substrate.

16. The display device of claim 15, wherein the sub-column spacer and the second spacer are spaced apart from the counter substrate.

17. The display device of claim 14, wherein the spacer blocks blue light having a center wavelength of about 420 nm to about 480 nm.

18. The display device of claim 14, wherein the spacer overlaps about 80% or more of a planar area of the scan driver.

19. The display device of claim 18, wherein at least one side of the spacer is disposed outside a side of the scan driver.

20. The display device of claim 14, wherein a first portion of the second long edge of the second spacer is disposed within a corresponding edge of the scan driver on the scan driver, and a second portion of the second long edge of the second spacer that is substantially less than the first portion is disposed outside the corresponding edge of the scan driver on the scan driver.

* * * * *